(12) United States Patent
Hsu

(10) Patent No.: US 7,443,668 B2
(45) Date of Patent: Oct. 28, 2008

(54) HARD DISK DRAWING DEVICE

(75) Inventor: Wei-Chung Hsu, Taipei Hsien (TW)

(73) Assignee: Universal Scientific Industrial Co., Ltd. (TW)

( * ) Notice: Subject to any disclaimer, the term of this patent is extended or adjusted under 35 U.S.C. 154(b) by 335 days.

(21) Appl. No.: 11/367,496

(22) Filed: Mar. 2, 2006

(65) Prior Publication Data

US 2007/0205702 A1    Sep. 6, 2007

(51) Int. Cl.
*G06F 1/16* (2006.01)
*A47B 81/00* (2006.01)

(52) U.S. Cl. .................................. 361/685; 312/223.1

(58) Field of Classification Search ................ 361/685, 361/724–727, 679–684, 686; 312/223.1, 312/223.2, 9.1, 332.1, 333; 211/26; 248/27.1, 248/27.3; 292/32, 33, 42, 137, 163, 150
See application file for complete search history.

(56) References Cited

U.S. PATENT DOCUMENTS

| | | | | |
|---|---|---|---|---|
| 6,351,379 B1 * | 2/2002 | Cheng | ........................ | 361/685 |
| 6,505,899 B1 * | 1/2003 | Jetter | ...................... | 312/223.1 |
| 6,826,056 B2 * | 11/2004 | Tsuyuki et al. | ............. | 361/725 |
| 2003/0099094 A1 * | 5/2003 | Coles et al. | ................. | 361/726 |
| 2004/0120107 A1 * | 6/2004 | Davis et al. | ................. | 361/683 |

* cited by examiner

*Primary Examiner*—Jaypraksh N Gandhi
*Assistant Examiner*—Nidhi Desai
(74) *Attorney, Agent, or Firm*—Sheridan Ross P.C.

(57) ABSTRACT

A hard disk drawing device includes: a latch housing having a front wall that is formed with a pair of guiding holes; a pair of fastening plates extending rearwardly from the latch housing in a longitudinal direction and adapted to hold a hard disk therebetween; a pair of latches mounted movably in the latch housing and movable along an axis perpendicular to the longitudinal direction between locked and unlocked positions; an urging member disposed between and abutting against the latches for urging the latches toward the locked position; and a pair of operating levers protruding frontwardly from the latches in the longitudinal direction through the guiding holes in the front wall of the latch housing for moving the latches toward each other from the locked position to the unlocked position.

4 Claims, 9 Drawing Sheets

US 7,443,668 B2

HARD DISK DRAWING DEVICE

BACKGROUND OF THE INVENTION

1. Field of the Invention

This invention relates to a hard disk drawing device, more particularly to a simple and easy-to-operate hard disk drawing device.

2. Description of the Related Art

As shown in FIGS. 1 and 2, Taiwanese Publication no. 560671 disclosed a removable hard disk device including a case unit 10 and a hard disk drawing unit 20 adapted to mount a hard disk 200 and removably disposed in the case unit 10. The case unit 10 is secured to a computer (not shown), and is formed with an L-shaped notch 15. The hard disk drawing unit 20 includes a front panel 21, a pivot element 23 pivoted to the front panel 21, and a latch plate 26. The front panel 21 includes a button 25 movable between a first position and a second position along a first axis. The latch plate 26 is movable in a second axis perpendicular to the first axis. The pivot element 23 is provided with a hook 231 and a pin 232.

When the button 25 is disposed at the first position, the hook 231 is locked with the latch plate 26, and the pin 232 extends into the L-shaped notch 15, thereby fixing the hard disk drawing unit 20 in the case unit 10. At this state (i.e., a locked state), the button 25 is spaced apart from the latch plate 26 by a first distance. When pressed from the first position to the second position, the button 25 drives the latch plate 26 to move along the second axis to disengage the hook 231, thereby permitting pivoting movement of the pivot element 23 and disengagement between the pin 232 and the L-shaped notch 15, thereby permitting removal of the hard disk drawing unit 20 from the case unit 10. At this state (i.e., an unlocked state), the button 25 is spaced apart from the latch plate 26 by a second distance that is shorter than the first distance.

Although the aforesaid hard disk device has the functions of fixing and removing from the case unit 10 in the computer, the structure thereof is relatively complex and inconvenient to operate.

SUMMARY OF THE INVENTION

Therefore, the object of the present invention is to provide a simple and easy-to-operate hard disk drawing device.

According to this invention, a hard disk drawing device comprises: a latch housing having a front wall that is formed with a pair of guiding holes; a pair of fastening plates extending rearwardly from the latch housing in a longitudinal direction and adapted to hold a hard disk therebetween; a pair of latches mounted movably in the latch housing and movable along an axis perpendicular to the longitudinal direction between locked and unlocked positions; an urging member disposed between and abutting against the latches for urging the latches toward the locked position; and a pair of operating levers protruding frontwardly from the latches in the longitudinal direction through the guiding holes in the front wall of the latch housing for moving the latches toward each other from the locked position to the unlocked position.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
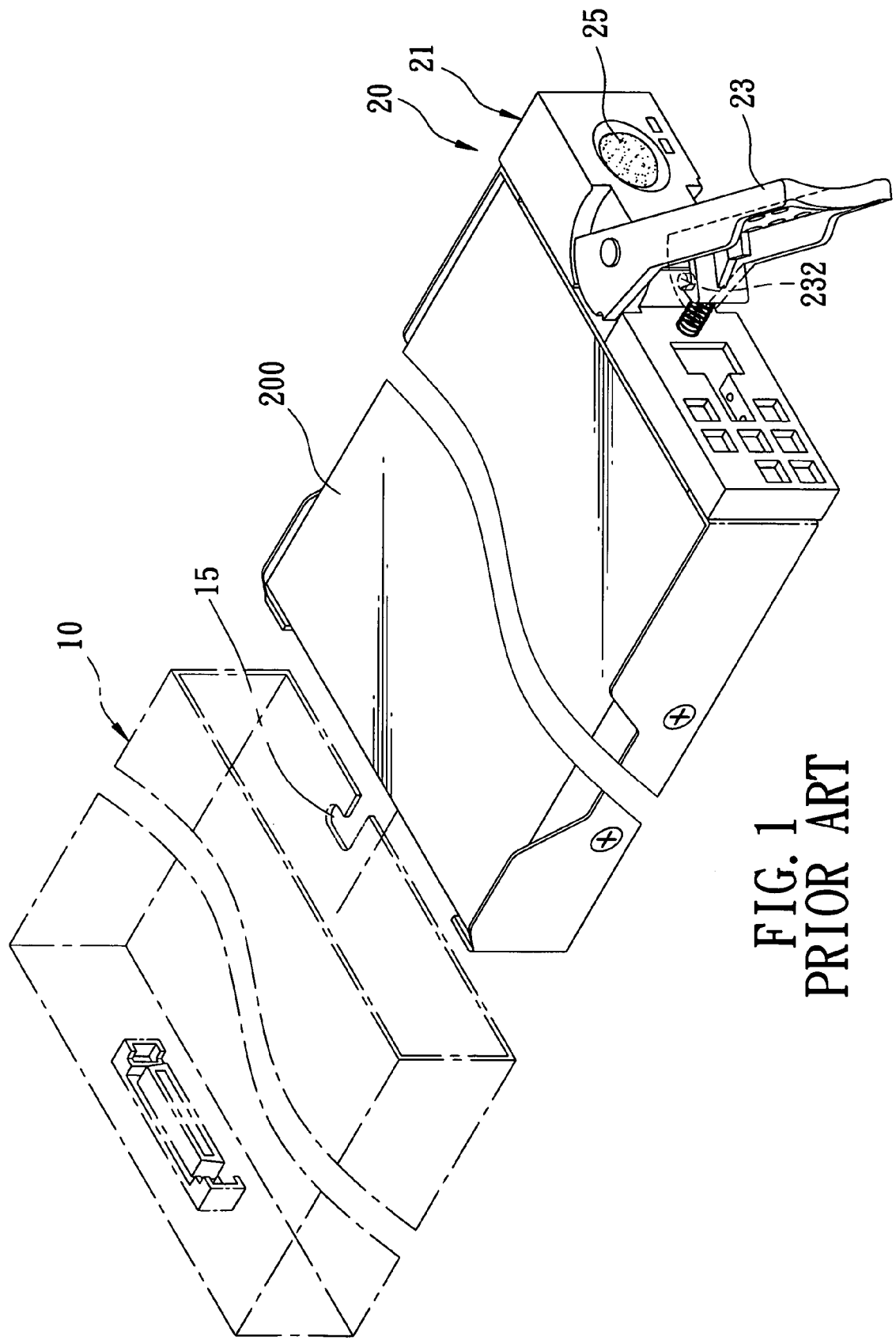
FIG. 1 is a fragmentary perspective view of a conventional removable hard disk device including a hard disk drawing unit and a case unit.
Figure 2:
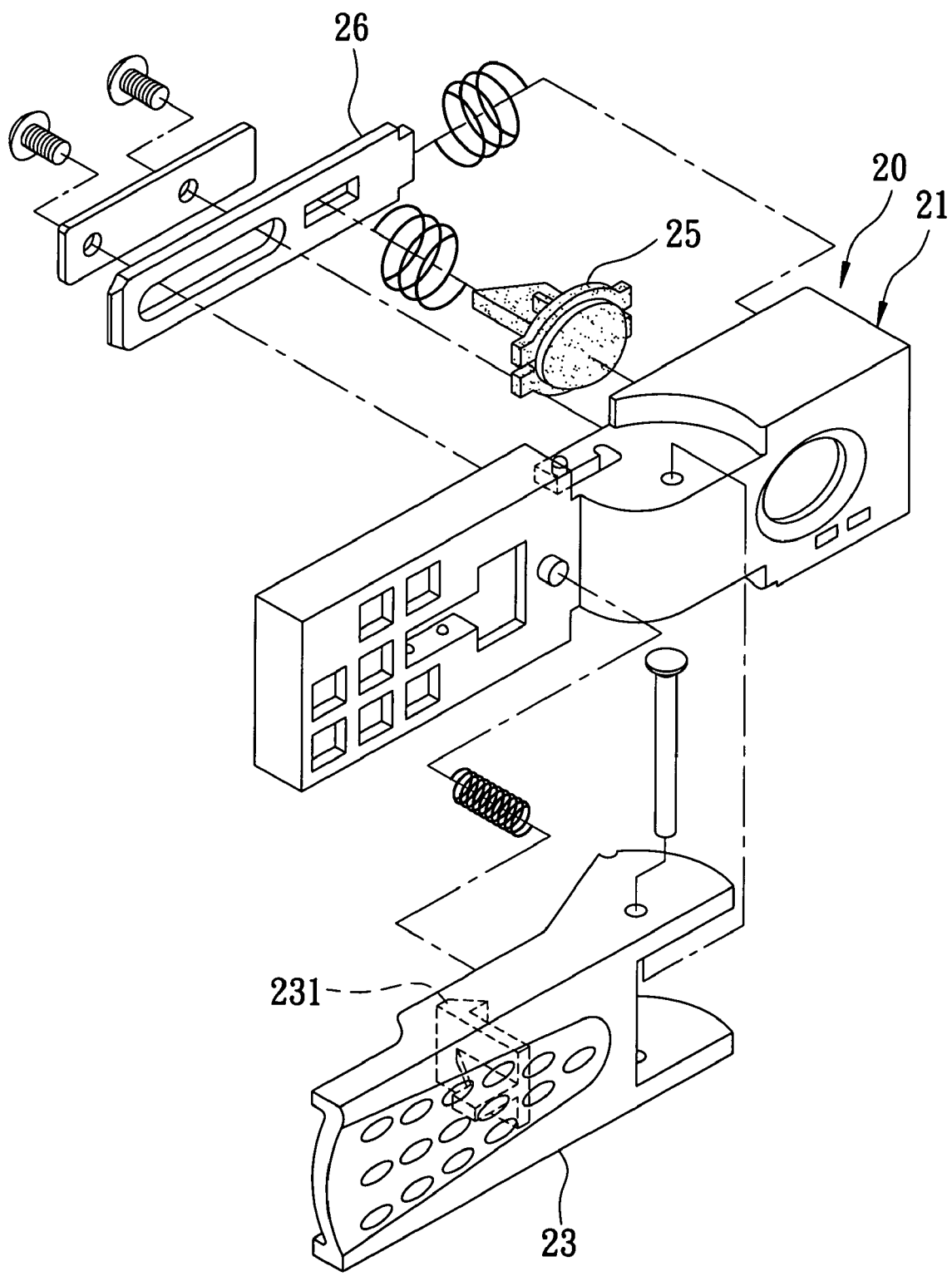
FIG. 2 is an exploded perspective view of the hard disk drawing unit of the conventional removable hard disk device shown in FIG. 1.

Before the present invention is described in greater detail with reference to the accompanying preferred embodiments, it should be noted herein that like elements are denoted by the same reference numerals throughout the disclosure.

Figure 3:
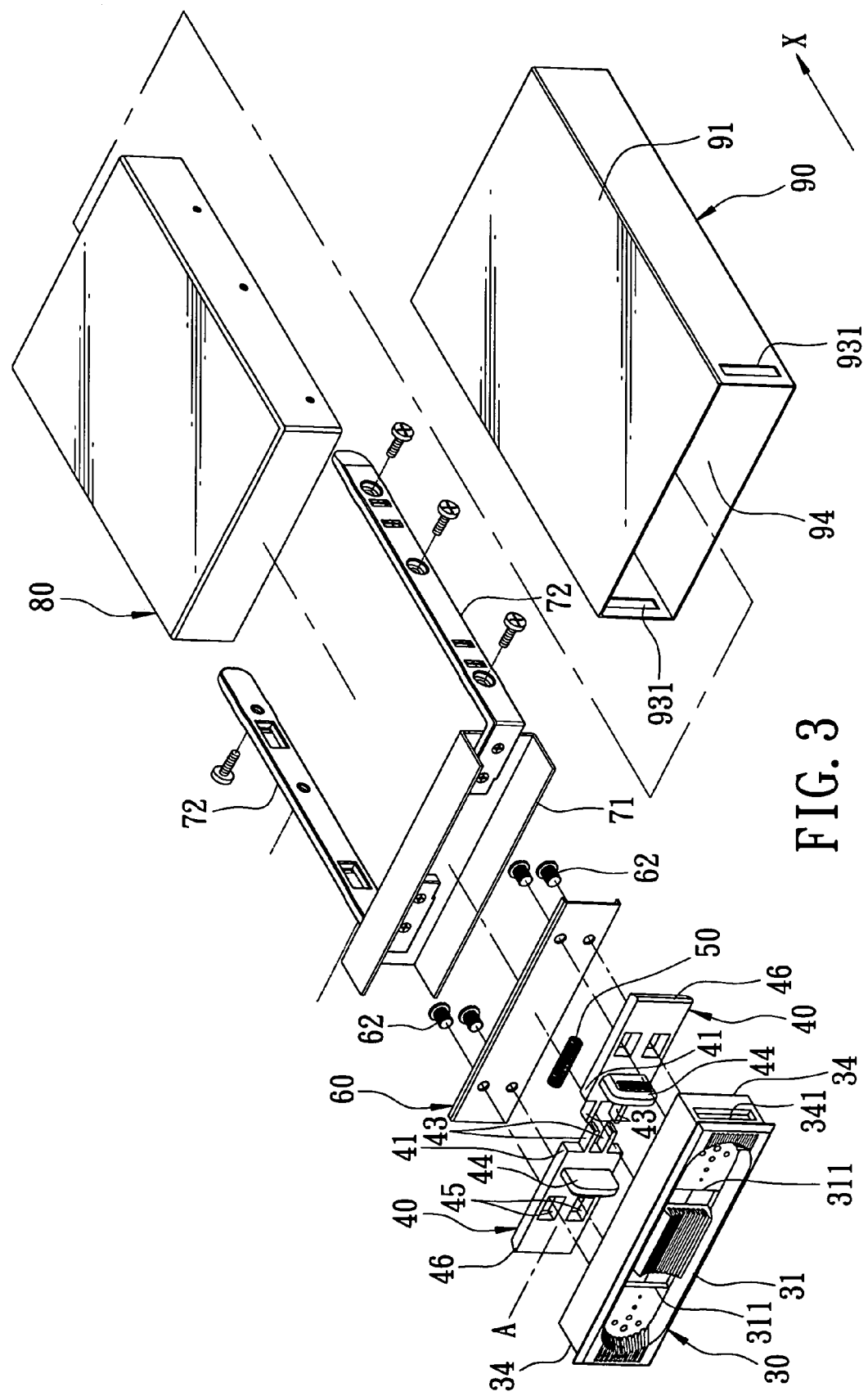
FIG. 3 is an exploded perspective view illustrating the arrangement relationship among the first preferred embodiment of a hard disk drawing device according to this invention, a hard disk, and a case unit.
Figure 4:
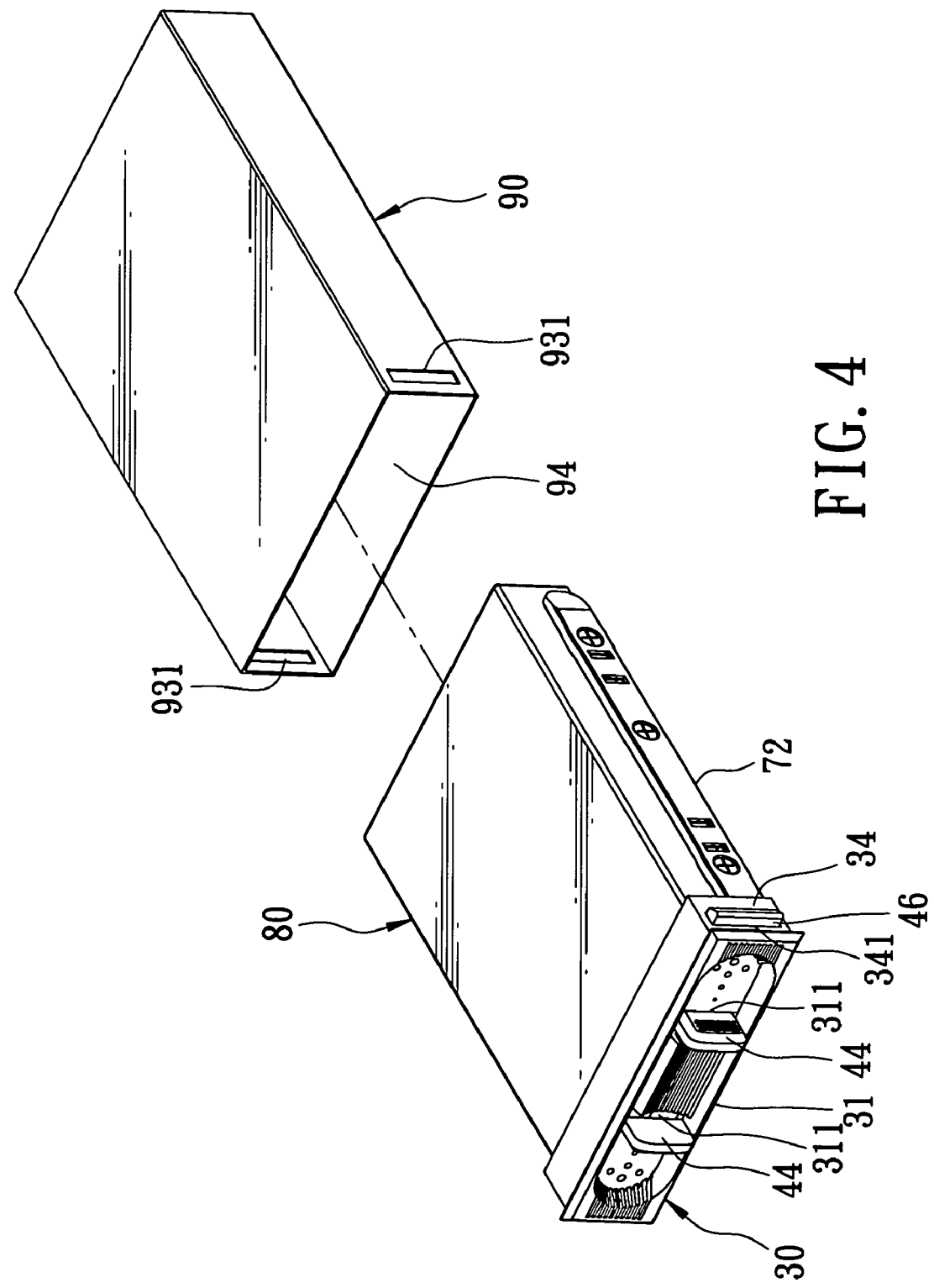
FIG. 4 is an assembled perspective view of the first preferred embodiment, in which the hard disk drawing device is removed from the case unit.

Referring to FIGS. 3 and 4, the first preferred embodiment of a hard disk drawing device according to the present invention is shown to include: a latch housing 30 having a front wall 31 that is formed with a pair of guiding holes 311; a pair of fastening plates 72 extending rearwardly from the latch housing 30 in a longitudinal direction (X) and adapted to hold a hard disk 80 therebetween; a pair of latches 40 mounted movably in the latch housing 30 and movable along an axis (A) perpendicular to the longitudinal direction (X) between locked and unlocked positions; an urging member 50 disposed between and abutting against the latches 40 for urging the latches 40 toward the locked position; and a pair of operating levers 44 protruding frontwardly from the latches 40 in the longitudinal direction (X) through the guiding holes 311 in the front wall 31 of the latch housing 30 for moving the latches 40 toward each other from the locked position to the unlocked position.

In this embodiment, the hard disk drawing device further includes a latch-mounting plate 60 and two pairs of screw rods 62. The latch-mounting plate 60 is mounted in the latch housing 30 and is aligned with the front wall 31 of the latch housing 30 along the longitudinal direction (X). The two pairs of the screw rods 62 extend from the latch-mounting plate 60 through the latches 40, respectively, and engage the front wall 31. Each of the latches 40 has an outer end 46 and an inner end 41. The inner end 41 is formed with a pair of confining tabs 43 spaced apart from each other and cooperating with the front wall 31 and the latch-mounting plate 60 to define a spring-accommodating space there among. The urging member 50 has opposite end portions, each of which extends into the spring-accommodating space between the confining tabs 43 of the inner end 44 of a respective one of the latches 40.

In this embodiment, each of the latches 40 is formed with two elongated through-holes 45 for extension of the screw rods 62 therethrough. Each of the operating levers 44 has a thickness in a direction parallel to the axis (A). Each of the guiding holes 311 has a width in a direction parallel to the axis (A) and greater than the thickness of the respective one of the operating levers 44. Each of the through-holes 45 has a width in a direction parallel to the axis (A) and greater than the diameter of the respective one of the screw rods 62 so as to permit movement of the latches 40 along the axis (A).

The latch housing 30 further includes two side walls 34, each of which is formed with a through hole 341 for extension of the respective one of the outer ends 46 of the latches 40 therethrough.

Preferably, the hard disk drawing device further includes a connecting plate 71 for connecting the fastening plates 72 to the latch housing 30 and for cooperating with the latch housing 30 to define an inner space for accommodating the latches 40 and the latch-mounting plate 60 therein.

Figure 5:
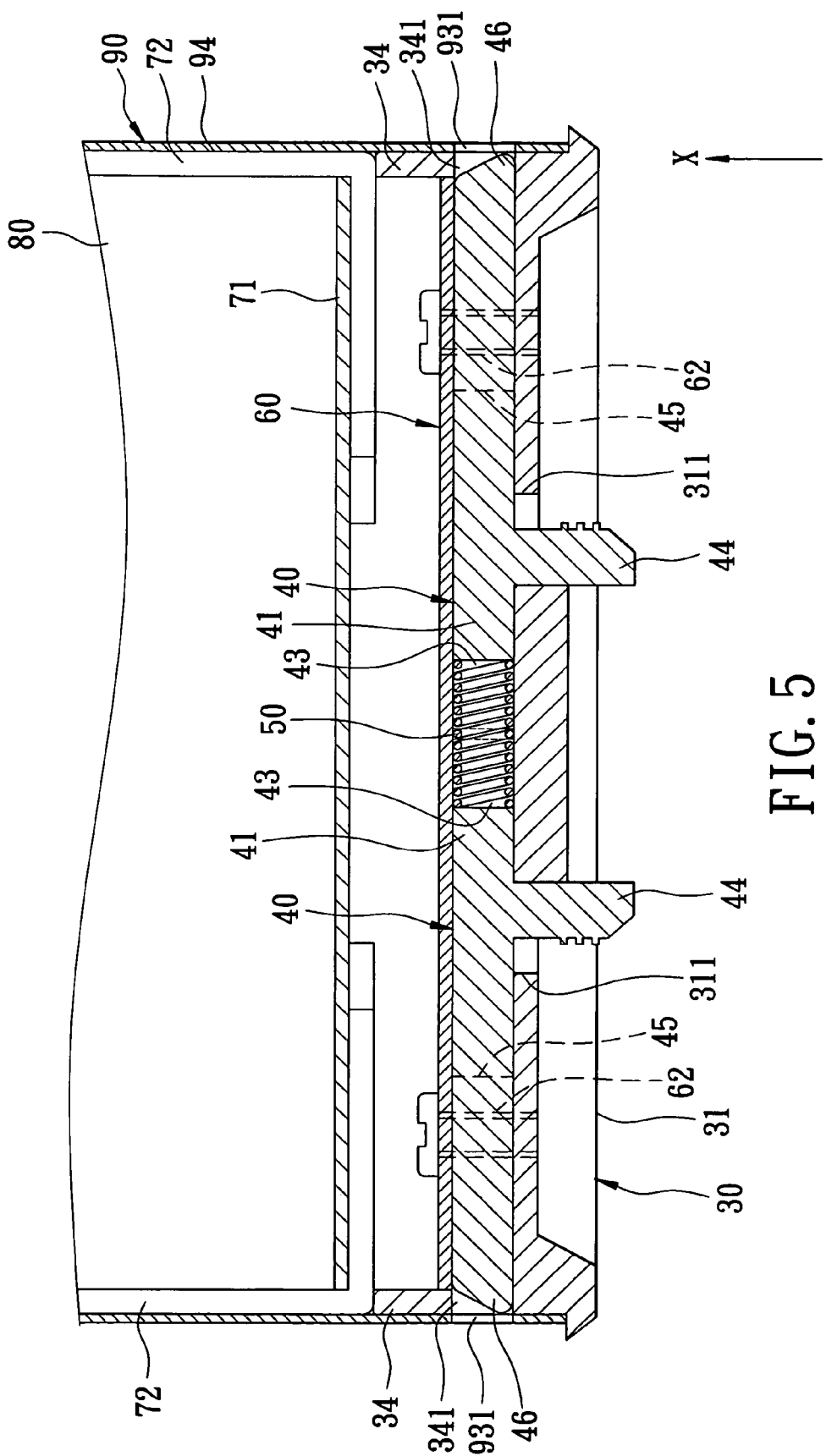
FIG. 5 is a fragmentary partly sectional view illustrating the first preferred embodiment of the hard disk drawing device at an unlocked state.
Figure 6:
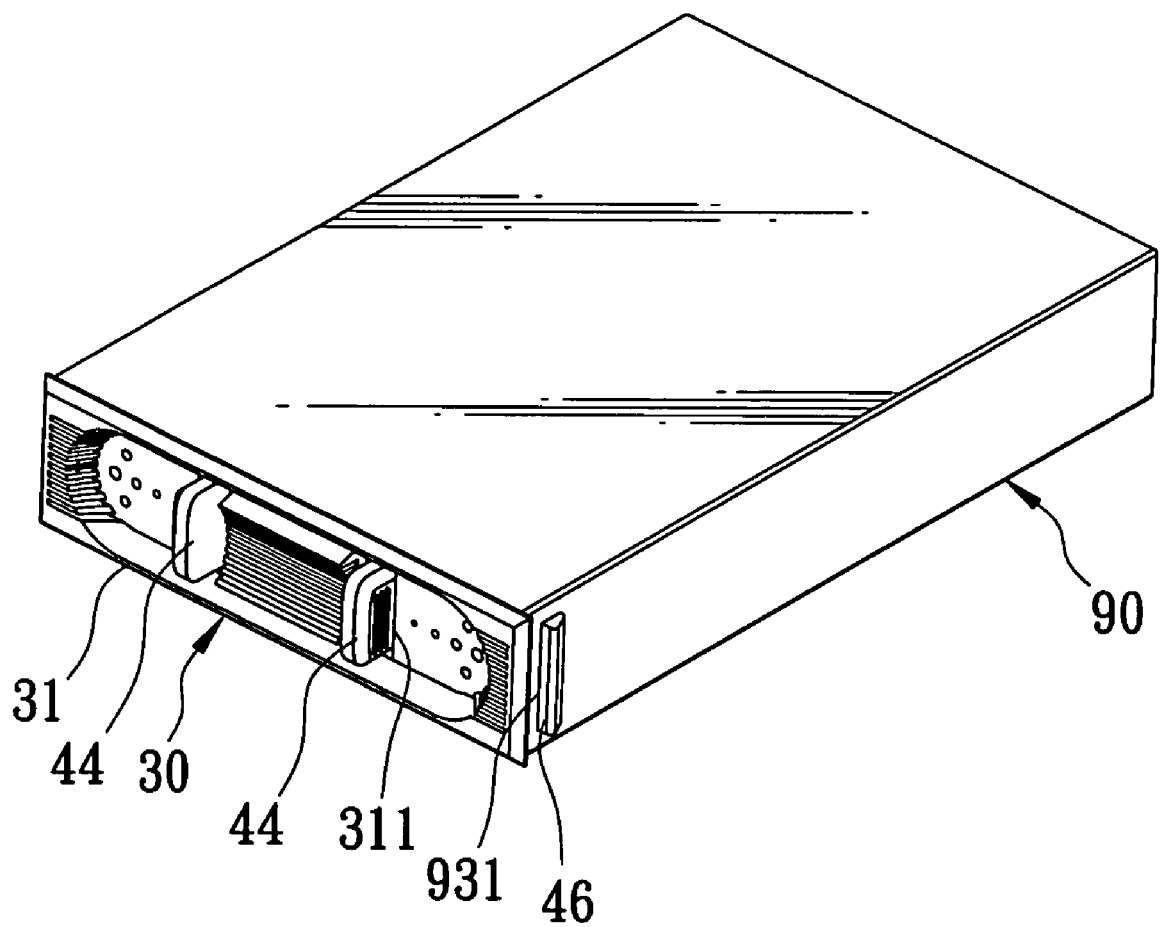
FIG. 6 is a perspective view showing the first preferred embodiment of the hard disk drawing device fixed to the case unit.
Figure 7:
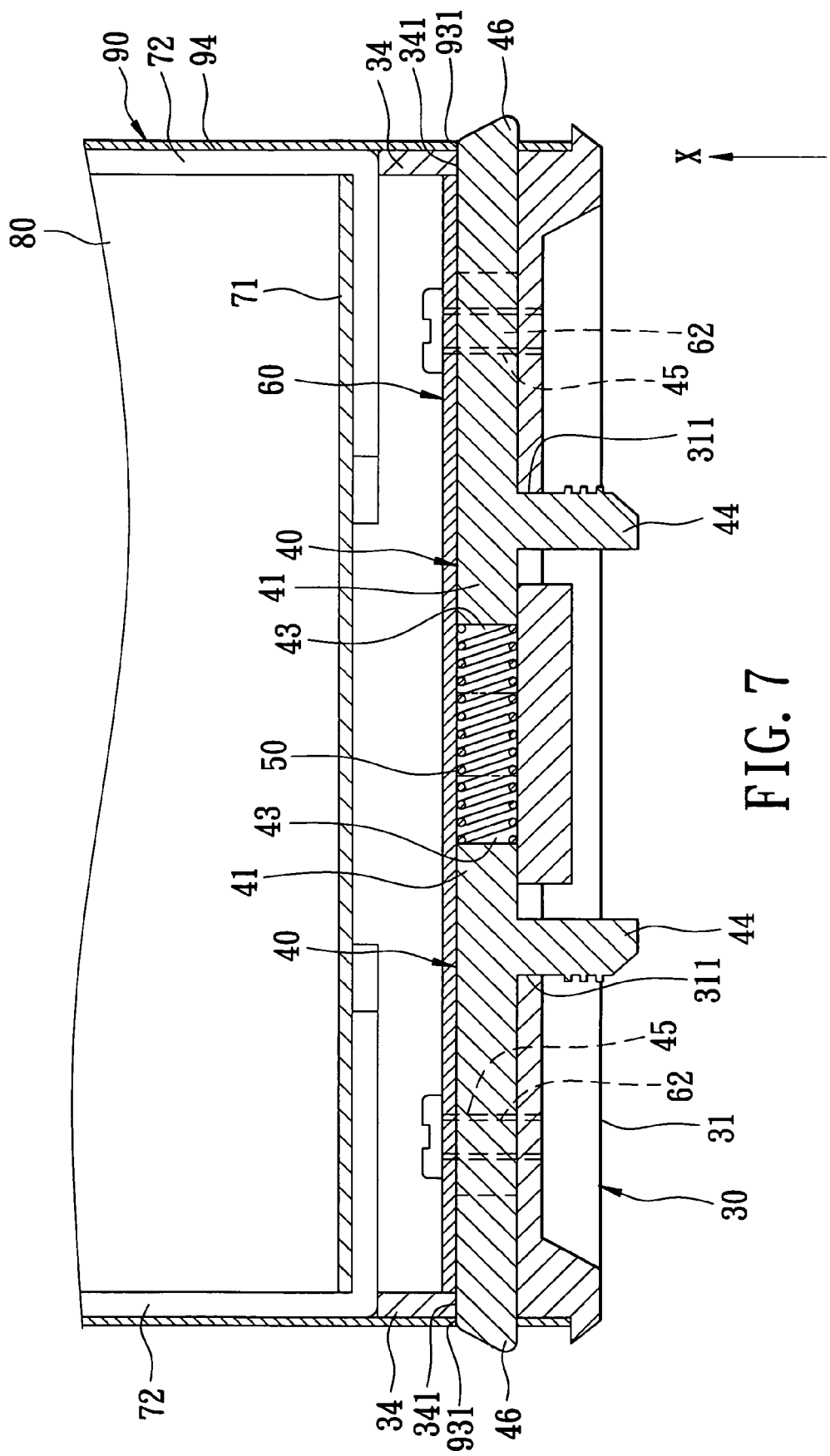
FIG. 7 is a fragmentary partly sectional view illustrating the first preferred embodiment of the hard disk drawing device at a locked state.

The hard disk drawing device is intended to hold a hard disk 80, and to be inserted into a case unit 90 secured in a computer (not shown). The case unit 90 has an outer wall 91 that defines an inner space 94 for accommodating an assembly of the hard disk drawing device and the hard disk 80, and that is formed with two positioning holes 931 corresponding to the through holes 341 of the latch housing 30. When the hard disk 80 is to be used with the computer, the operating levers 44 are forced to move toward each other against the urging force of the urging member 50 such that the latches 40 are moved from the locked position to the unlocked position along the axis (A). After inserting the assembly of the hard disk drawing device and the hard disk 80 into the case unit 90 in the computer, the force applied to the operating levers 44 is released, and the latches 40 are automatically restored to the locked position by the urging action of the urging member 50. At this position, each of the outer ends 46 of the latches 40 extends through the respective through hole 341 in the latch housing 30 and the respective positioning hole 931 in the outer wall 91 of the case unit 90 (see FIG. 7), thereby fixing the assembly of the hard disk drawing device and the hard disk 80 in the case unit 90 (see FIG. 6). When the hard disk 80 is to be removed from the computer, the operating levers 44 are once again forced to move toward each other against the urging force of the urging member 50 such that the outer ends 46 of the latches 40 are retracted from the through holes 341 in the latch housing 30 and the positioning holes 931 in the outer wall 91 of the case unit 90, respectively (i.e., at the unlocked position, see FIG. 5). Thereafter, the operating levers 44 are pulled in the longitudinal direction, thereby removing the assembly of the hard disk drawing device and the hard disk 80 from the case unit 90 (see FIG. 4).

Figure 8:
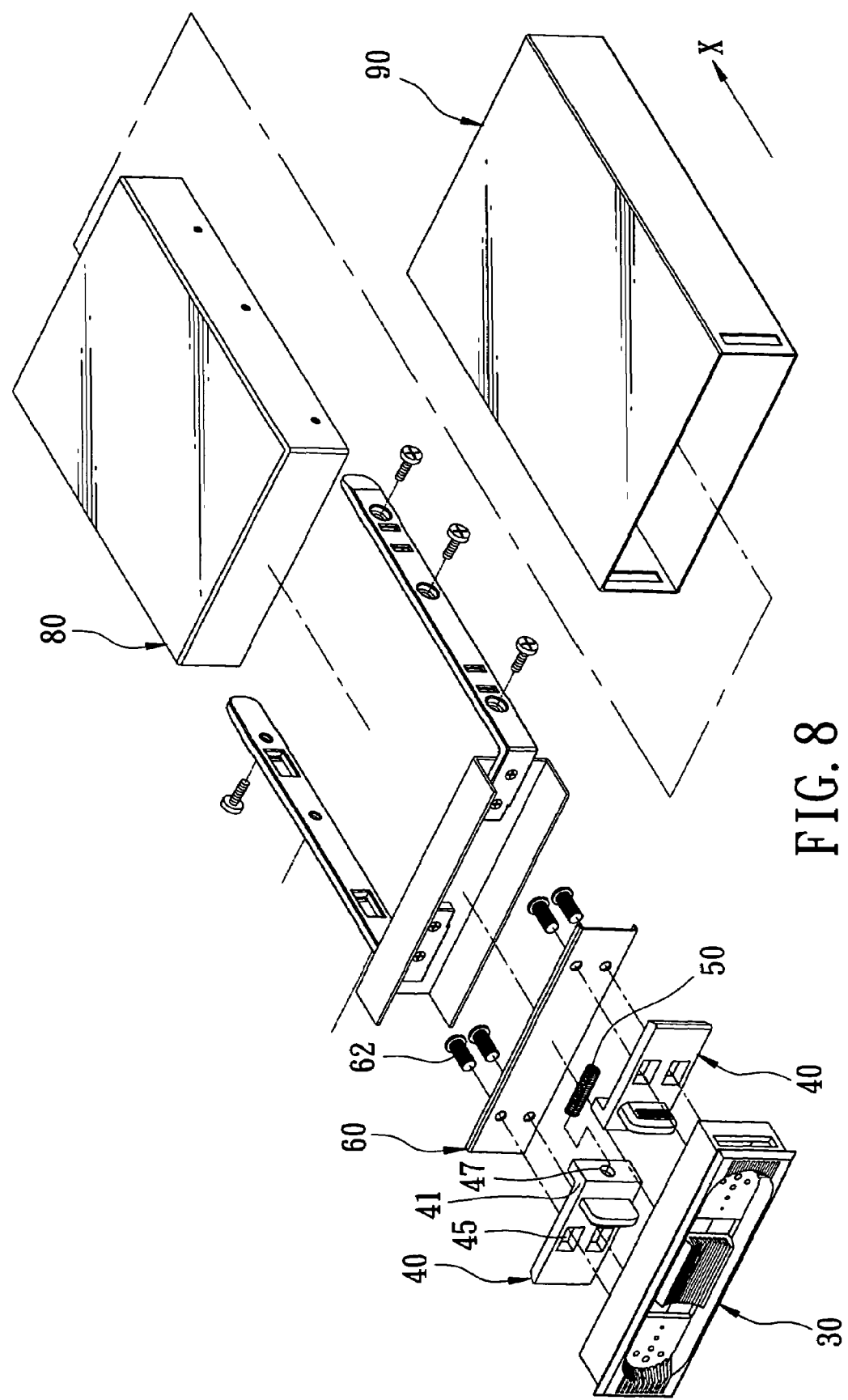
FIG. 8 is an exploded perspective view of the second preferred embodiment of the hard disk drawing device according to this invention.

FIG. 8 illustrates the second preferred embodiment of the hard disk drawing device according to this invention. The second preferred embodiment differs from the first preferred embodiment in the structure of the latches 40. In this preferred embodiment, each of the latches 40 has an inner end 41 that is formed with a blind hole 47. The two opposite ends of the urging member 50 extend into the blind holes 47 in the inner ends 41 of the latches 40, respectively.

Figure 9:
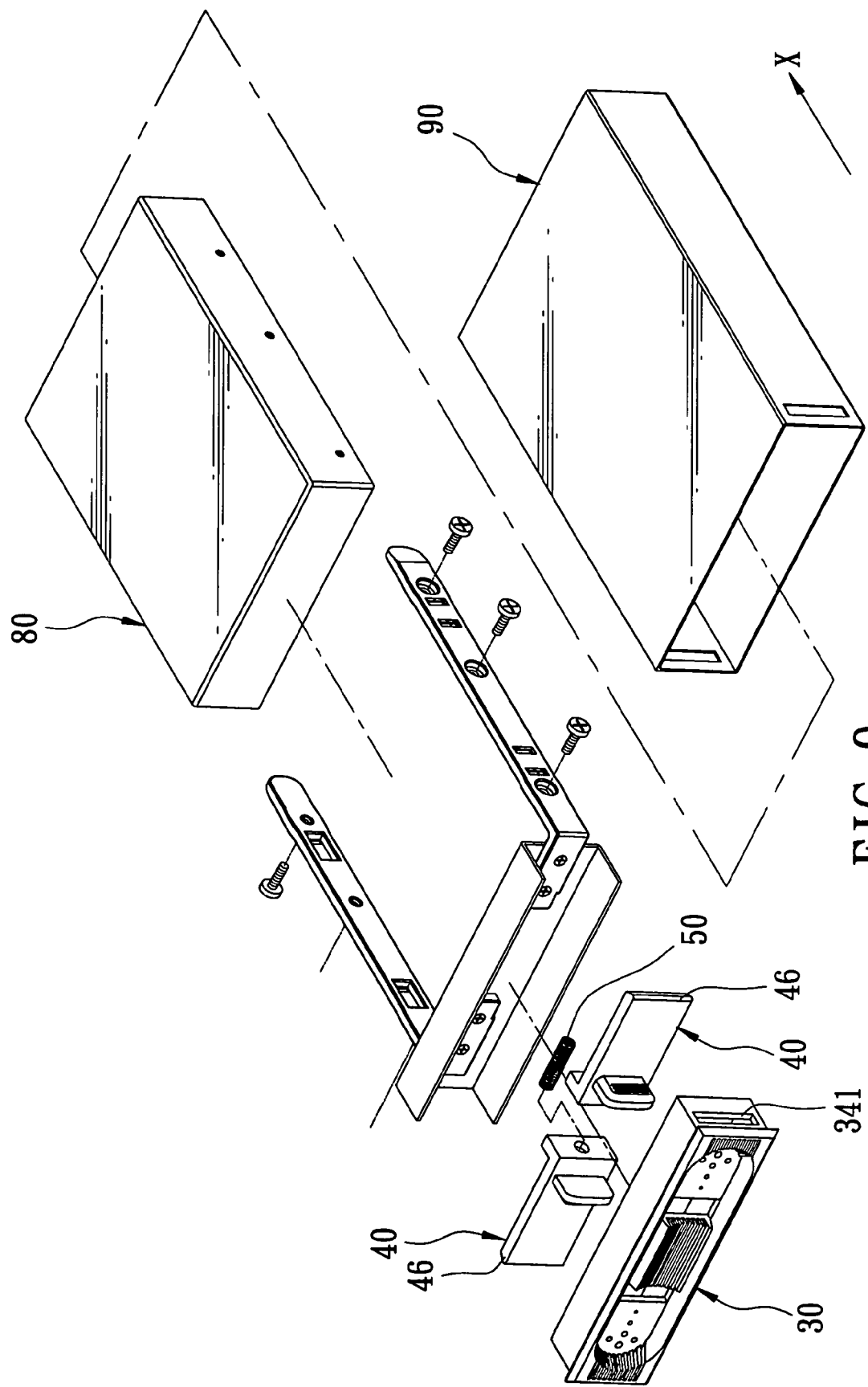
FIG. 9 is an exploded perspective view of the third preferred embodiment of the hard disk drawing device according to this invention.

FIG. 9 illustrates the third preferred embodiment of the hard disk drawing device according to this invention. The third preferred embodiment differs from the second preferred embodiment in that the latch-mounting plate 60 and the screw rods 62 as well as the elongated through-holes 45 are dispensed with.

Since the structure of the hard disk drawing device according to the present invention is simpler than that of the prior art, the manufacturing costs can be reduced. Moreover, the operation of the hard disk drawing device of this invention is more convenient than that of the aforesaid conventional hard disk drawing device.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A hard disk drawing device comprising:
 a latch housing having a front wall that is formed with a pair of guiding holes;
 a pair of fastening plates extending rearwardly from said latch housing in a longitudinal direction and adapted to hold a hard disk therebetween;
 a pair of latches mounted movably in said latch housing and movable along an axis perpendicular to said longitudinal direction between locked and unlocked positions;
 an urging member disposed between and abutting against said latches for urging said latches toward said locked position;
 a pair of operating levers protruding frontwardly from said latches in said longitudinal direction through said guiding holes in said front wall of said latch housing for moving said latches toward each other from said locked position to said unlocked position; and
 a latch-mounting plate mounted in said latch housing and aligned with said front wall of said latch housing along said longitudinal direction, and at least a pair of screw rods extending from said latch-mounting plate through said latches, respectively, and engaging said front wall, each of said latches having an inner end that is formed with a pair of confining tabs spaced apart from each other and cooperating with said front wall and said latch-mounting plate to define a spring-accommodating space thereamong, said urging member having opposite end portions, each of which extends into said spring-accommodating space between said confining tabs of said inner end of a respective one of said latches.

2. The hard disk drawing device of claim 1, wherein each of said latches is formed with at least one elongated through-hole for extension of the respective one of said screw rods therethrough, each of said operating levers having a thickness in a direction parallel to said axis, each of said guiding holes having a width in a direction parallel to said axis and greater than the thickness of the respective one of said operating levers, said through-hole of each of said latches having a width in a direction parallel to said axis and greater than the diameter of the respective one of said screw rods so as to permit movement of said latches along said axis.

3. A hard disk drawing device comprising:
 a latch housing having a front wall that is formed with a pair of guiding holes;
 a pair of fastening plates extending rearwardly from said latch housing in a longitudinal direction and adapted to hold a hard disk therebetween;
 a pair of latches mounted movably in said latch housing and movable along an axis perpendicular to said longitudinal direction between locked and unlocked positions;

an urging member disposed between and abutting against said latches for urging said latches toward said locked position;

a pair of operating levers protruding frontwardly from said latches in said longitudinal direction through said guiding holes in said front wall of said latch housing for moving said latches toward each other from said locked position to said unlocked position; and a latch-mounting plate mounted in said latch housing and aligned with said front wall of said latch housing along said longitudinal direction, and at least a pair of screw rods extending from said latch-mounting plate through said latches, respectively, and engaging said front wall;

wherein each of said latches has an inner end that is formed with a blind hole, said urging member having two opposite ends extending into said blind holes in said inner ends of said latches, respectively.

4. The hard disk drawing device of claim 3, wherein each of said latches is formed with at least one elongated through-hole for extension of the respective one of said screw rods therethrough, each of said operating levers having a thickness in a direction parallel to said axis, each of said guiding holes having a width in a direction parallel to said axis and greater than the thickness of the respective one of said operating levers, said through-hole of each of said latches having a width in a direction parallel to said axis and greater than the diameter of-the respective one of said screw rods so as to permit movement of said latches along said axis.

* * * * *